United States Patent [19]  [11] 4,130,067
Kilgus, deceased et al.  [45] Dec. 19, 1978

[54] VEHICLE TIE-DOWN HOOK ASSEMBLY FOR RAILWAY CARS

[76] Inventors: Donald C. Kilgus, deceased, late of Grosse Point Woods, Mich., by Marjorie M. Kilgus, executrix, 1288 Fairholme Rd., Grosse Point Woods, Mich. 48236

[21] Appl. No.: 795,402

[22] Filed: May 9, 1977

Related U.S. Application Data

[62] Division of Ser. No. 703,594, Jul. 8, 1976, Pat. No. 4,044,691.

[51] Int. Cl.² ............ B61D 45/00; F16B 35/00; F16B 37/00; F16G 15/00
[52] U.S. Cl. ............... 105/368 R; 24/116 R; 85/1 R; 105/483; 114/200; 248/499; 403/317; 24/230.5 R
[58] Field of Search ........... 24/116 A, 116 R, 128, 24/230.5 R; 59/93; 70/18, 49; 85/1 R, 1 SS, 1 R; 105/368 T, 477, 482, 483, 484, 368 R; 108/55.1, 55.3; 114/199, 200; 206/335; 220/1.5; 248/499; 403/317

[56] References Cited

U.S. PATENT DOCUMENTS

| 346,685 | 8/1886 | Robbins | 114/200 X |
| 677,188 | 6/1901 | Drees | 114/200 |
| 721,397 | 2/1903 | Smith | 24/230.5 R |
| 2,845,672 | 8/1958 | Molene | 24/116 A |
| 2,973,566 | 3/1961 | Elsner | 24/116 R |
| 3,142,264 | 7/1964 | DeBoer | 105/483 |
| 3,820,817 | 6/1974 | Harold | 105/368 T X |
| 3,865,048 | 2/1975 | Wallace | 105/484 |
| 4,022,134 | 5/1977 | Krokos | 105/477 X |
| 4,043,275 | 8/1977 | Rochester, Jr. | 24/116 R X |
| 4,044,691 | 8/1977 | Kilgus et al. | 105/482 X |

Primary Examiner—Albert J. Makay
Assistant Examiner—Howard Beltran
Attorney, Agent, or Firm—Olsen and Stephenson

[57] ABSTRACT

A system for securing vehicles to a rail car for transport thereby, with the system including a bi-directional tie-down assembly and a ratchet assembly, or the like, separate therefrom and with the bi-directional tie-down assembly having a double chain in a triangulated configuration for restraining the associated vehicle at the point of engagement. A pivotable hook assembly is provided which allows the selection of one or more hook configurations.

3 Claims, 7 Drawing Figures

VEHICLE TIE-DOWN HOOK ASSEMBLY FOR RAILWAY CARS

REFERENCE TO PENDING APPLICATION

This application is a division of application Ser. No. 703,594, filed on July 8, 1976 now matured into U.S. Pat. No. 4,044,691, issued Aug. 30, 1977.

SUMMARY BACKGROUND OF THE INVENTION

The present invention relates to vehicle tie-down systems for use in securing vehicles for transport on rail cars and, more particularly, relates to a system utilizing a double chain in a triangulated configuration.

It is common in tie-down systems to secure the four corners of a vehicle to a structure on a rail car, or the like. This is commonly referred to as "four-point tie-down." It would be desirable to provide a system utilizing a "two-point tie-down" on the front and rear of the same side of the vehicle, or a single device on each side of the vehicle, since a substantial labor savings could result in loading of the vehicles. One problem, however, has been the concern with safety and stability, since single-chain constructions have been used. With single-chain structures in a two-point system, in the event one chain breaks or is not connected properly, forward and rearward stability of the vehicle would be lost. In the system of the present invention, each tie-down point has, in a sense, a double-chain structure; and since the chain is connected in a triangulated configuration, each tie-down point independently resists forward and rearward movement. Thus, in the system of the present invention in the event the chain breaks or is improperly connected at one tie-down point, the other chain at the other tie-down point will provide the means necessary to maintain the fore and aft stability of the vehicle. As will be seen, even though a single-chain structure is used to define the triangulated structure, a break in one section of the chain would still leave the other section intact to assist the chain at the other point in securing the vehicle.

Further, with reference to the two-point tie-down system of the present invention, it has been found that the verticle impact loads transmitted into the vehicle during transport are reduced. It is believed that this occurs because the suspension system on the untied portion of the vehicle can function less restrictedly than when all four points are tied down and, hence, loads imparted to the vehicle can be more readily absorbed.

Therefore, it is an object of the present invention to provide a novel two-point tie-down system for vehicles generally of the type as described.

It is another object of the present invention to provide a novel two-point tie-down system utilizing a single chain at each tie-down point connected in a triangulated configuration.

It is a common practice to pull the vehicle down against its suspension to provide a predesired amount of compressive reload. In the system of the present invention, a bi-directional tie-down assembly is used in conjunction with a separate ratcheting device. The bi-directional tie-down assembly is selectively movably located in a track on the rail car and can be fixed at selected locations. The bi-directional tie-down assembly has a construction providing for the triangulated chain construction. As the chain is tensioned pulling the vehicle closer to the rail, the apex of the triangle moves closer to what would be its base. However, the base does not change in length, thereby assuring adequate separation of the two legs of the triangle, and hence thereby assuring good forward and rearward retention of the vehicle.

Once initial vertical pull down of the vehicle is attained against the vehicles own suspension system, further vertical movement of the chain sections has no effect on the fore and aft movement of the vehicle allowing close bumper to bumper loading of vehicles.

As previously stated, in the present system, the triangulated chain assembly is tensioned by a separate ratcheting device, which can be any of several constructions well known in the art. The use of a separate ratchet provides an advantage, since it can be located remotely from the bi-directional tie-down assembly, including the triangulated chain. This permits the triangulated chain to be connected to the ratcheting device via a single chain extending from the bi-directional tie-down assembly, thereby permitting the ratchet assembly to be located at the most convenient point for ease of operator actuation.

Therefore, it is another object of the present invention to provide a novel tie-down system including a bi-directional tie-down assembly adapted to provide a triangulated chain configuration and a separate chain take-up device or ratchet device locatable remotely therefrom.

It is another object of the present invention to provide a novel tie-down system including bi-directional tie-down assembly adapted to provide a triangulated chain construction with the base of the defined triangle remaining constant in length regardless of the tensioning of the chain.

In the present invention, a novel hook construction is shown permitting a single, continuous chain to define the triangulated chain construction. Therefore, it is another object of the present invention to provide a novel hook construction for use in the above-described system.

It is another general object to provide a novel tie-down system for securing vehicles to a rail car for transport thereby.

Further objects, features and advantages of this invention will become apparent from a consideration of the following description, the appended claims, and the accompanying drawings in which:

Figure 1:
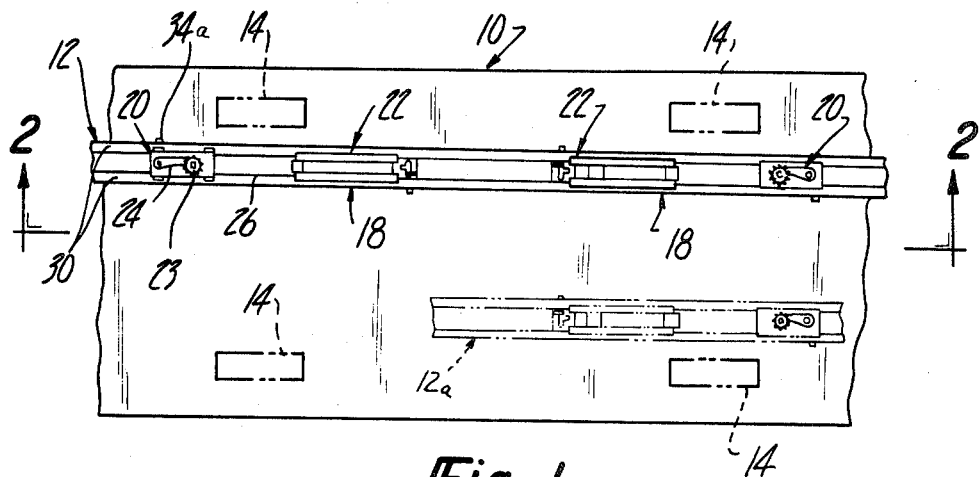
FIG. 1 is a plan view of a portion of a rail car, including the system of the present invention.
Figure 2:
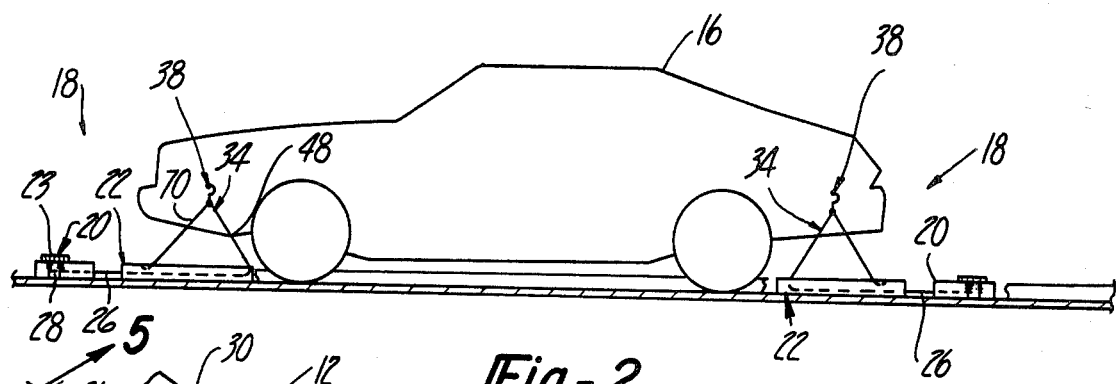
FIG. 2 is a sectional view with some parts shown broken away and taken generally along the line 2—2 in FIG. 1.

Looking now to FIG. 1, a rail car 10 is partially shown and has a track 12 extending longitudinally and fixed thereto. The wheels 14 of a vehicle 16 (partially shown) are shown in their positions relative to a pair of tie-down assemblies 18 located fore and aft of the vehicle 16. Note that the system shown is a two-point tie-down system, and hence, only two assemblies 18 are shown for connection to the front and rear of the vehicle 16 at the same side thereof. Since the assemblies 18 are identical, the details of only one assembly need be described.

The assembly 18 includes a ratchet or chain tensioning device 20 and a bi-directional tie-down assembly 22. Both of the devices 20 and 22 are movably supported in the track 12. The ratchet device 20 can be of a construction well known in the art and can be of a form shown in the United States patent to Blunden, et al, U.S. Pat. No. 3,564,577, issued Feb. 16, 1971, or the patent to Peisner, et al., U.S. Pat. No. 3,673,969, issued July 4, 1972; and the disclosures of these patents are incorporated herein by reference. It should be sufficient to note that the ratchet device 20 includes a rotatable ratchet gear 23 and a pawl 24. The ratchet gear 23 and pawl 24 cooperate in a conventional manner to permit winding up a connecting chain 26 which has one end connected to a shaft 28 which, in turn, is connected to the ratchet gear 23.

Thus, as the ratchet gear 23 is rotated, via a suitable tool (not shown), the connecting chain 26 is wound around the shaft 28 and, hence, is retracted. The pawl 24, until its manual release, will hold the connecting chain 26 in the desired position.

Figure 3:
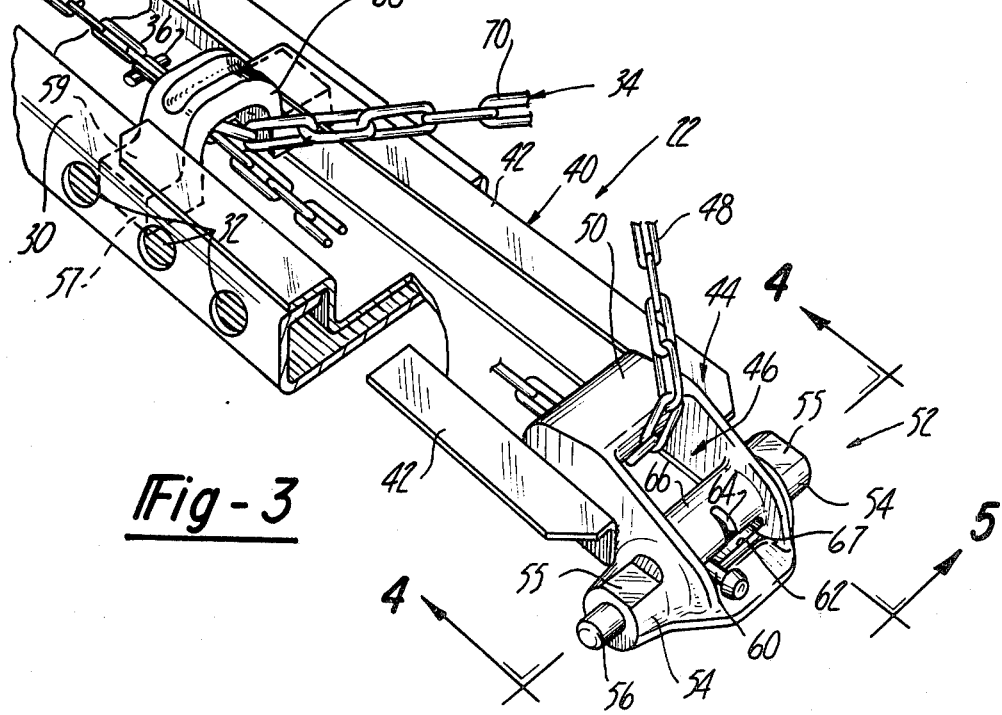
FIG. 3 is a pictorial view with some parts broken away and some shown in section of the idler and chain in assembly relationship on a track.

The track 12 is generally of a C-channel construction and includes a pair of upper flanges 30 which vertically restrain the body of the ratchet device 20. The track 12 has a plurality of longitudinally spaced openings 32 on opposite sides thereof which are adapted to receive a selectively retractable spring-loaded pin 34a on the ratchet device 20. Thus, the longitudinal position of the ratchet device 20 can be selectively set and fixed via the pin 34a. The connecting chain 26 is connected to the free ends of a pull chain 34 (see FIG. 3) via a connecting pin 36. The pull chain 34 is also connected to a connector assembly 38 adapted for connecting to the frame or body of the vehicle 16.

The bi-directional tie-down assembly 22 includes an elongated idler body 40 of a hat-shape channel construction in cross section having a pair of outwardly extending flanges 42. The body 40 is movably located along the track 12 and is vertically supported via the flanges 42 on the flanges 30 of the track.

Figure 4:
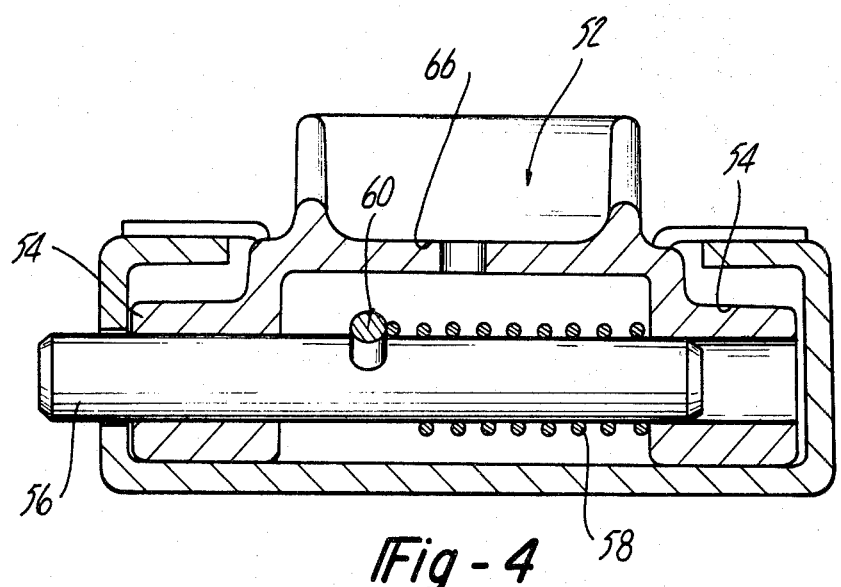
FIG. 4 is a sectional view taken generally along the lines 4—4 in FIG. 3.
Figure 5:
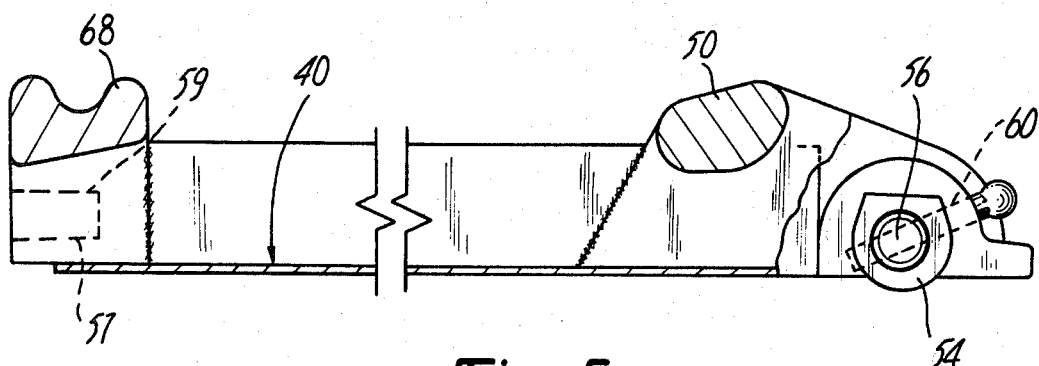
FIG. 5 is a sectional view taken generally along the lines 5—5 in FIG. 3.

A lock block 44 is secured at one end of the body 40 and has an opening 46 for receiving one section 48 of pull chain 34. A support portion 50 is located at the upper end f the opening 46 and is engaged by the chain section 48. The lock block 44 also includes a pin assembly 52 (FIG. 4). The block 44 includes a pair of axially aligned bosses 54 which slidably support a lock pin 56. A coil spring 58 (FIG. 4) normally urges the pin 56 outwardly from one of the bosses 54 by engagement with an actuating arm 60 and the opposite boss 54. The arm 60 is connected to the pin 56 and extends outwardly from a inverted T-slot 62 in a block portion 66 located between the bosses 54. The T-slot 62 has a leg portion 64 in which the arm 60 can be located to hold the pin 56 in its retracted position. To release pin 56, the operator need merely move the arm 60 downwardly into the base 67 of the slot 62, whereby the spring 58 will urge the pin 56 outwardly such that it can engage one of the openings 32 in the side of the track 12 to longitudinally lock the bi-directional tie-down assembly 22 in a preselected position.

An idler block 68 of substantially inverted U-shape is secured to the opposite end of the channel body 40. While the chain section 48 extends down from hook 38 under the support portion 50, a second chain section 70 extends in the opposite direction from the hook 38 and passes under the front support block 68. The chain section 48 extends along the channel body 40 and also extends under the idler block 68. The two free ends of the pull chain 34 which are at the ends of chain sections 48 and 70 are then connected to the connecting chain 26 via the pin 36, as previously described.

The bosses 54 have flats 55 which can engage the undersides of flanges 30 to vertically restrain the body 40. Likewise, a pair of bosses 57 on front idler 68 have flats 59 which similarly can engage the undersides of the flanges 30 to vertically restrain the body 40.

In order to secure the vehicle 16, the ratchet device 20 can be actuated to retract the connecting chain 26, thereby applying a pull to the chain sections 48 and 70 whereby the vehicle 16 will be pulled downwardly at the point where the hook 38 engages the vehicle 16. The vehicle 16 can be released simply by releasing the pawl 24 whereby the connecting chain 26 and pull chain 34 will be released.

It is to be noted that the chain sections 48 and 70 define a triangular configuration and that the base of the defined triangle, i.e., the length of chain between supports 50 and 68, will not vary; and, hence, the sections 48 and 70 will be maintained a fixed distance apart regardless of how far the hook 38 (representing the apex of the triangle) is pulled downwardly. The sections 48 and 70 provide support from fore and aft motion, respectively, of the vehicle 16. Note that, even if one chain section is broken, the other will still be intact to assist the other assembly 18. Thus, the two-point tie-down of the present invention has the inherent advantage of applying both forwardly and rearwardly directed forces to the vehicle 16 at the hooks 38. This is due to the fact that each of the chain sections 48 and 70 applies a force to its associated hook 38 which can be represented by a downwardly directed vector and a horizontal vector which is either rearwardly or forwardly directed.

Another advantage is obtained by keeping the ratchet device 20 and the idler device 22 separate is that this facilitates location along the track 12. In addition, the separation permits a single strand of chain to be fed to the take-up or chain tensioning device, hence, permitting the triangulated double-chain type of structure shown. In other words, there must be a sufficient length of single chain to permit adequate take up; to attempt to provide a device having capacity to take up a double strand of chain would require an extemely cumbersome and, perhaps, impractical structure.

In a further application of the two-point tie-down system of the present invention, a second track 12a (shown in phantom lines in FIG. 1) is spaced from and parallel to the track 12. The track 12a enables a side-by-side positioning of a pair of tie-down assemblies 18 and thus further affords a greater flexibility in connecting the tie-down assemblies 18 to the most advantageous positions on the underside of the vehicle 16. In addition to providing a lateral spacing between the tie-down assemblies 18, the parallel tracks 12 and 12a further make it possible for the tie-down assemblies 22 to be longitudinally spaced, one forwardly of the other. This flexibility resulting from the use of the tracks 12 and 12a enables the tie-down to be made at positions on the vehicle 16 which are least injurious to the vehicle 16 when it is subjected to impacts during transportation. Since each tie-down assembly 18 provides a forward and rearward horizontal vector, the fore and aft stability of the vehicle is continually maintained.

Figure 6:
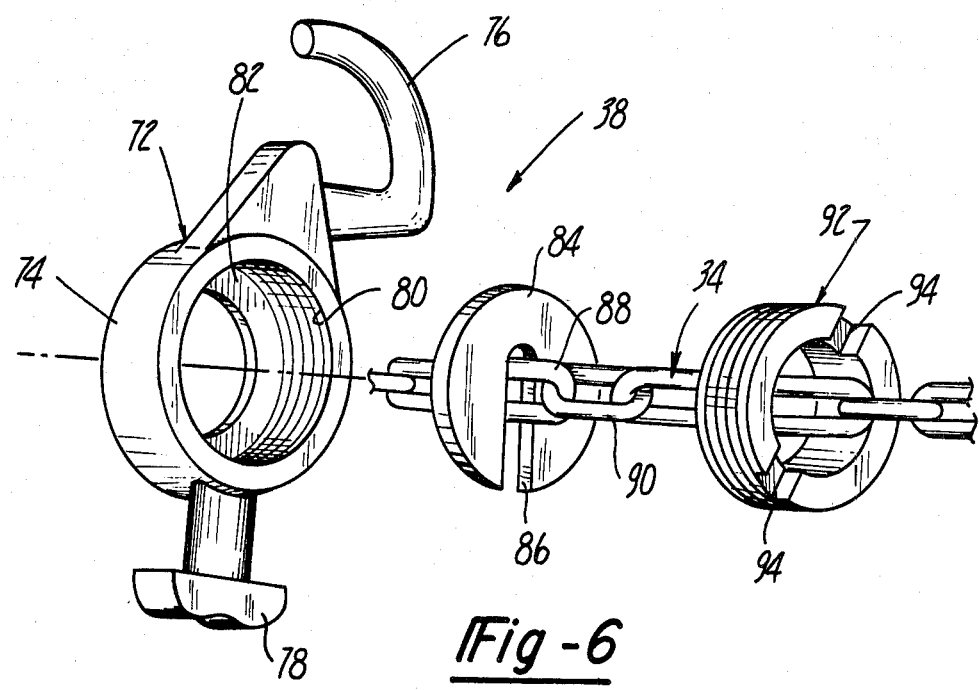
FIG. 6 is an exploded pictorial view of the hook construction in assembly relationship with a clain for use in the system shown in FIGS. 1-5.
Figure 7:
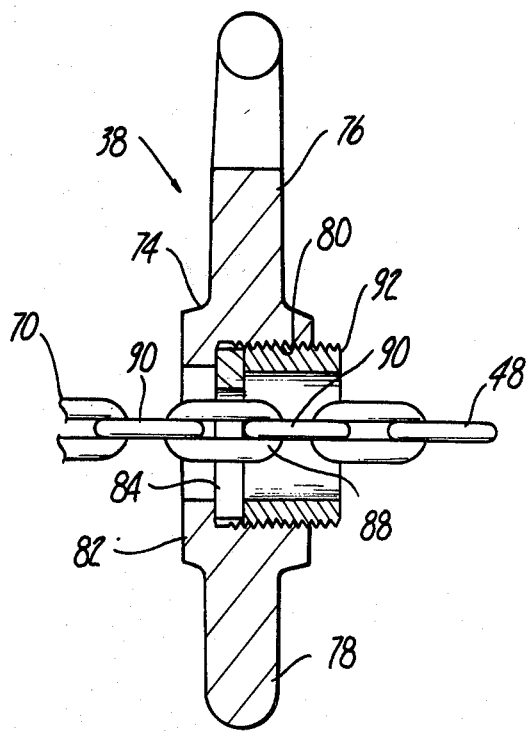
FIG. 7 is a vertical sectional view of the hook and chain of FIG. 6 with the components of the hook shown in assembled relationship.

As noted, the pull chain 34, while providing separate chain sections 48 and 70, is a single, continuous length of chain. This structure is achievable by virtue of the novel chain connector structure 38 (see FIGS. 6 and 7). The hook structure 38 includes a hook body 72 having a cylindrical portion 74. The portion 74 has a hook shape portion 76 extending radially outwardly from one side thereof and a T-bar portion 78 radially extending oppositely from the hook portion 76. The hook portion 76 and T-bar portion 78 permit connection to the different types of openings used on different vehicles. The cylindrical portion 74 has an internally threaded bore 80, terminating in a radially inwardly extending flange 82. A slotted retaining washer 84 is slidably telescoped into bore 80 and has a radial slot 86 of a width sufficient to receive one link 88 of the pull chain 34 across its narrow dimension. Thus, the links 90 on opposite ends of link 88 cannot pass through the slot 86. The washer 84, with chain assembled, is located in the bore 80 and abuts the flange 82. A cylindrical hollow nut 92 is externally threaded and is threaded into bore 80 to hold the washer 84 intact against flange 82. A pair of diametrically aligned slots 94 permit insertion of a suitable tool (not shown) for tightening the nut 92. Thus, the hook assembly 38 permits the use of a single chain which can be fixed at a preselected point to define the chain sections 48 and 70 to have their desired lengths. Note that, if section 48 breaks, section 70 will still be operable, and vice versa (unless the break occurs at either of the immediately adjacent links 90).

From the above description, it is seen that this invention provides a tie-down system in which the tie-down chains 34 are configured so that the sections 48 and 70 of the chains apply downwardly inclined forces to the vehicle 16 at the connector assemblies 38. Each of these forces has a downwardly directed vector or component, and a horizontally directed vector or component, with the horizontally directed components being in opposite directions. Both forwardly and rearwardly directed forces are thus applied to the vehicle 16 at each of the connector assemblies 38. Thus, two forwardly directed and two rearwardly directed forces are exerted on the vehicle 16 by the chains 34. This provides a factor of safety of two which insures firm tie-down of the vehicle 16 on the rail car in the event either one of the chains 34 should break during transport of the vehicle.

What is claimed:

1. In a tie-down system for securing a vehicle to a rail car, tie-down chains each comprised of connected links of predetermined thickness and width, and a connector assembly for releasably connecting each of said chains to said vehicle, said assembly comprising a hollow body, means on said body operable to connect the body to the vehicle, a disc positioned in said body, said disc having an open ended transverse slot formed therein of a width greater than the thickness and less than the width of a chain link, said chain having one of the links therein positioned in said slot disposed, and means mounted on said body releasably retaining said disc therein, said disc being arranged in said body so that the links of said chain adjacent to the link positioned in said slot cooperate with said disc to prevent movement out of said slot of said link positioned therein.

2. The structure according to claim 1 wherein said means for retaining said disc on said body is a threaded hollow nut threadably mounted within said body and operable to releasably clamp said disc against said body.

3. In a two point tie-down system for securing a vehicle to a rail car, said vehicle being secured to said car by said system, said system including a hook means mounted on a chain, said chain being adjustably secured to said rail car, said hook means including a body and at least two hook extensions for alternate use, a first hook extension being generally C-shaped, having one end outwardly of said body, said one end being adapted to be inserted into an opening in said vehicle of complementary shape to thereby securely attach said vehicle to said chain, and a second hook extension projecting outwardly of said body, said second hook extension having an enlarged end portion at its outer end which is of greater size in at least one direction than the cross-sectional portion of said second hook extension immediately adjacent the body, said enlarged end portion being adapted for insertion into the second type of opening of said vehicle frame to securely attach said vehicle to said system, and means to lock said body of said hook means to a link of said chain to prevent movement relative to said chain comprising means forming an opening in said body, a disc having an open ended slot for receiving a link of said chain, and means releasably retaining said disc in said opening, said slot being dimensioned so that movement through said slot of the links of said chain adjacent to the link positioned in said slot is restrained.

* * * * *